United States Patent [19]

Amedei et al.

[11] 4,092,047
[45] May 30, 1978

[54] CONTROL DEVICE FOR A MOTOR VEHICLE PNEUMATIC BRAKING SYSTEM

[75] Inventors: Giuseppe Amedei; Carlo Alberto Quilico, both of Turin; Virginio Maggioni, Rosta (Turin), all of Italy

[73] Assignee: FIAT Societa per Azioni, Turin, Italy

[21] Appl. No.: 705,490

[22] Filed: July 15, 1976

[30] Foreign Application Priority Data

July 29, 1975  Italy .................. 68971 A/75

[51] Int. Cl.² ............................................. B60T 8/22
[52] U.S. Cl. ................................. 303/22 R; 303/6 C
[58] Field of Search ............... 303/6 R, 6 C, 22 R, 303/22 A; 188/195

[56] References Cited

U.S. PATENT DOCUMENTS

| | | | |
|---|---|---|---|
| 3,413,042 | 11/1968 | Herold | 303/22 R |
| 3,420,256 | 1/1969 | Kobnick | 303/6 C |
| 3,442,557 | 5/1969 | Oberthur | 188/195 |
| 3,503,657 | 3/1970 | MacDuff | 303/22 R |
| 3,649,084 | 3/1972 | Stelzer | 303/22 R |
| 3,653,721 | 4/1972 | Klimek | 303/6 C |
| 3,967,861 | 7/1976 | Nagara | 303/22 R |
| 4,008,925 | 2/1977 | Young | 303/22 R |

FOREIGN PATENT DOCUMENTS

| | | | |
|---|---|---|---|
| 1,802,370 | 7/1969 | Germany | 303/22 A |
| 1,958,398 | 5/1971 | Germany | 303/22 R |
| 1,416,209 | 12/1975 | United Kingdom | 303/6 C |

*Primary Examiner*—Trygve M. Blix
*Assistant Examiner*—Edward R. Kazenske
*Attorney, Agent, or Firm*—Sughrue, Rothwell, Mion, Zinn and Macpeak

[57] ABSTRACT

A control device for a pneumatic braking system which is particularly suitable for industrial trucks and lorries the axle loading of which varies widely depending on whether the truck is empty or fully laden. The device has an inlet port which in use is fed with the braking control pressure, and an outlet port which feeds a servovalve to determine the pressure fed to the brakes of, for example, the rear wheels. The control device comprises a generally cylindrical housing separated into two chambers by a piston, the two chambers communicate with each other through a controlled restrictor passage the size of the opening of which is controlled by the position of the piston. The exposed area of the piston in one chamber is greater than in the other, so that when the pressure in both chambers is the same, the piston experiences a resultant force towards the other chamber but movement is resisted by a force proportional to the axle loading derived by a mechanical or fluid pressure arrangement. If the braking control pressure in the two chambers reaches a value such that the resultant force on the piston is greater than the applied force the piston moves partly closing the restrictor thereby reducing the pressure in the one chamber until the forces on the piston are balanced. The outlet port from the device is fed from the one chamber so that the outlet braking pressure is reduced with respect to the inlet pressure in these circumstances.

1 Claim, 2 Drawing Figures

CONTROL DEVICE FOR A MOTOR VEHICLE PNEUMATIC BRAKING SYSTEM

The present invention relates generally to pneumatic braking systems for motor vehicles, and particularly to devices for modifying the braking pressure generated in the braking circuit upon depression of the brake pedal, in dependence on the load exerted on the axles of the vehicle.

One of the major problems of this type of control device is that of adequately controlling the pressure of air fed to the brakes of the vehicle so as to obtain a balanced braking action on the wheels of the front and rear axles of the vehicle in all the different operating conditions encountered in use of the vehicle.

The object of the present invention is to provide a control device of the abovementioned type, for a motor vehicle pneumatic braking system, which is of simple and economic construction and which is capable of varying in a particularly advantageous manner the present of the air fed to the brakes of at least one axle of a vehicle to which it is fitted, in dependence on the braking pressure applied to the brake pedal and the load on this or both axles of the vehicle.

According to the present invention there is provided a control device for a pneumatic braking system of a motor vehicle, characterised by the fact that it comprises a generally cylindrical housing closed at each end by respective transverse end walls, a piston slidable along a cylindrical bore in the housing and having a first part with a smaller diameter located slidably within a first part of the said cylindrical bore which has a corresponding smaller diameter, and a second part with a larger diameter located slidably within a second part of the bore which has a corresponding larger diameter, the said piston separating the bore in the housing into a first chamber into which leads an inlet port of the housing and a second chamber from which leads an outlet port of the housing, the area of the operative face of the piston exposed in the first chamber being less than the area of the operative face of the piston exposed in the second chamber so that the piston experiences a resultant force towards the first chamber when the pressure in both chambers is the same, the first and second chambers being interconnected by a transfer passageway formed in or by the piston and incorporating a variable restrictor controlled in dependence on the position of the piston in such a way that the size of the restrictor passage is reduced upon movement of the piston towards the first chamber whereby to reduce the pressure in the second chamber with respect to that in the first chamber and means for applying to the said piston a force in a sense such as to resist the said resultant force tending to move the piston towards the first chamber due to the difference in area between the faces of the piston exposed in the first and second chambers respectively, the arrangement being such that when the resultant force acting on the piston due to the said difference in areas exceeds the said force applied to the piston, this latter is displaced towards the said first chamber thereby reducing the size of the restrictor opening and thus the pressure in the second chamber until the forces on the piston are balanced, thereby reducing the pressure at the outlet port with respect to that at the inlet port.

Various embodiments of the invention will now be more particularly described, by way of example, with reference to the accompanying drawings, in which.

Figure 1:
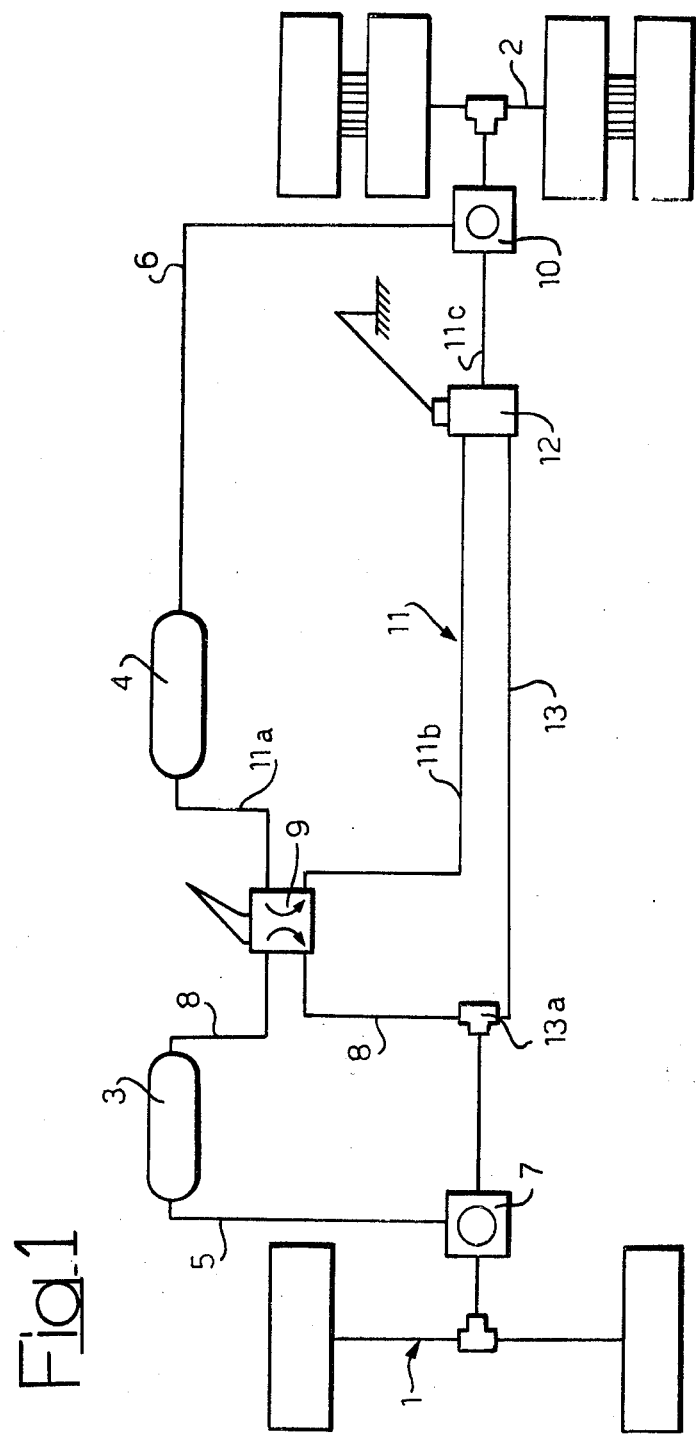
FIG. 1 is a diagram of a pneumatic braking system provided with a control device according to the invention.

Referring now to the drawings, and particularly to FIG. 1, there is shown schematically a braking circuit for the front axle 1 and the rear axle 2 of an industrial truck or motor vehicle. The braking circuit includes two reservoirs 3, 4, for compressed air which is fed in a controlled manner to the brakes of the front axle or axles 1 and the rear axle or axles 2 when the brake pedal (not shown) is depressed. The reservoir 3 is connected to the front brakes of the motor vehicle by a line 5 which feeds through a servo-valve 7 which controls the pressure and the flow of air from the reservoir 3 to the brakes of the front axle 1. The servo-valve 7 is connected by a pneumatic control line 8 to the reservoir 3 via a distributor valve 9 whose operational position is controlled by the force exerted by the operator on the brake pedal (not shown).

The brakes of the rear axle 2 are fed from the reservoir 4 along a line 6 and through a servo-valve 10. The servo-valve 10 is controlled by the pressure in a control line 11 which is fed to a control device 12 having two fluid pressure control inlets one of which is fed with pressure along a line 11b which is fed with compressed air from the reservoir 4 by the distributor valve 9 and the other of which is fed by a line 13 which is fed with the pressure in the line 8 tapped off at a junction 13a. The control device 12 also has a mechanical connection between the rear axle 2 and a fixed part of the body or chassis of the vehicle so as to modify the pressure on the line 11c in dependence on the axle loading as will be described in detail below.

Figure 2:
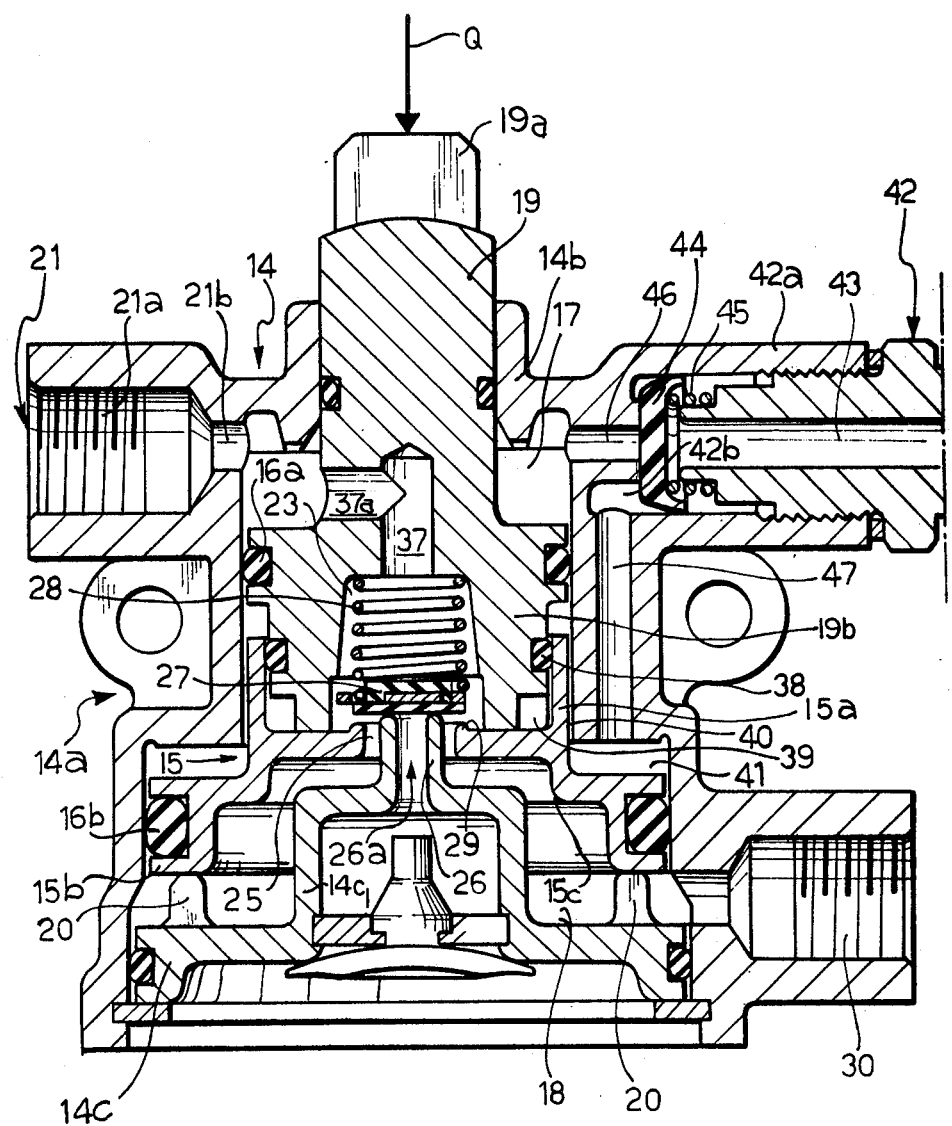
FIG. 2 is a sectional view in greater detail of the control device according to the present invention.

An embodiment of the control device 12 is shown in greater detail in FIG. 2 and comprises an outer body 14 having a shaped, generally cylindrical housing 14a closed at each end by respective transverse end walls 14b, 14c. Although the device 12 may be mounted in any orientation it will be described herein in the orientation in which it is shown in the drawings as in an "upright" orientation and references to upper and lower parts should be construed accordingly as references only to the drawings. The generally cylindrical housing 14a has a cylindrical bore in two parts, one having a radius which is greater than the other. Within this two-part bore slides a shaped piston 15 having a first part 15a of smaller radius in the form of a cylindrical sleeve, and a second part 15b with a larger radius. These two parts are joined by an intermediate annular connection part 15c. The second part 15b of the piston is slidingly sealed in the larger part of the bore by sealing ring 16b. Between the end face of the first smaller part 15a of the piston and the facing transverse wall 14b of the housing there is defined a first chamber 17, and between the end face of the second larger part of the piston and the facing transverse wall 14c of the housing 14a there is defined a second chamber 18. Within the first chamber 17 is located a plunger 19 which has a plunger stem 19a projecting out from the housing 14a and a cylindrical body 19b adjacent the inward end thereof. The body 19b is slightly smaller in diameter than the diameter of the first chamber 17 and is slidably sealed relative thereto by sealing ring 16a.

The transverse wall 14c at the wider end of the bore in the housing 14a has a central boss 14c₁ which projects towards the narrower end of the bore in the housng 14a. The transverse wall 14c and the opposed end face of the piston 15 define between them, and the wider part of the bore in the housing 14a, a second chamber 18 which communicates through an annular passageway between the piston 15 and a hollow axial spigot 26 projecting from the boss 14c, with the first chamber 17.

In use of the device a force Q is applied to the free projecting end 19a of the plunger 19 tending to displace it along the first chamber 17 towards the second chamber 18. The force Q is proportional to the load on the axle of the vehicle on which the device operates. The plunger 19 bears against the piston 15 so that displacement of the plunger 19 towards the second chamber 18 thus also causes displacement of the piston in a direction such as to reduce the volume of the second chamber 18. Such displacement of the piston 15 is limited, however, by the presence of a number of projections 20 provided on the internal surface of the transverse wall 14c of the housing 14.

Against the end of the hollow axial spigot 26 is pressed a sealing element 27 by one end of a compression spring 28, the other end of which presses against the end face of the recess 23 in the plunger 19. The opening in the piston 15 which defines the outer face of the annular passage 25 has an axially projecting lip 29 around its rim, with which the sealing element 27, which is in the form of a plate, cooperates in such a way as to form a control valve which controls the flow of compressed air between the two chambers 17 and 18. The hollow spigot 26 has an axial hole 26a one end of which communicates (except when the sealing element 27 is pressed against it) with the first chamber 17 and the opposite end of which communicates with the atmosphere.

The inlet 21 which is connected to line 11b opens directly into the first chamber 17. The narrower part of the piston 15 is formed as a cylindrical skirt 15a into which a part of the plunger 19 projects and is sealed by a sealing ring 38. Between the facing surfaces of the plunger 19 and the piston 15 there is formed an intermediate annular chamber 39 communicating with a central chamber 23 formed by a recess in the plunger 19. The chamber 23 communicates via an axial passageway 37 in the plunger 19 and a radial passageway 37a, with the first chamber 17. Between the outer surface of the cylindrical skirt 15a and the facing surface of the cylindrical bore in the housing 14 a side clearance is provided forming an annular duct 40. This annular duct 40 opens into an annular chamber 41 facing the larger part 15b of the piston 15 opposite the face thereof which forms part of the second chamber 18. The sealing ring 38 between the body of the plunger 19 and the inner surface of the annular skirt 15a prevents, in normal operating conditions of the device, the passage of compressed air from the annular chamber 39 to the annular chamber 41 through the annular duct 40.

The reference numeral 42 indicates a connector union provided with a central hole 43. The union 42 screws into a threaded socket 42a in the housing 14 from which leads a passageway 46, aligned with the central hole 43 in the union 42, and opening into the first chamber 17. Within the socket 42a, and covering the passageway 46 there is a valve element 44 of elastomeric material which is pressed against the mouth of the passageway 46 by a compression spring 45 compressed between the sealing element itself and the union 42.

A duct 47 leading from the annular chamber 41 opens into a small chamber 42b at the base of the socket 42a, which is closed by the rim of the sealing element 44. The union 42 is connected at the end of the pipe 13 (see FIG. 1) which connects the control device 12 to the junction 13a of the control circuit 8 of the front brakes of the motor vehicle. When the vehicle is loaded, the device illustrated in FIG. 2 operates so that the braking pressure at the outlet 30 varies directly with the inlet pressure up to a point determined by the force Q. If the force Q acting on the plunger 19 is absent, the action of the compressed air in the central chamber 23 and in the annular chamber 39 is such as to cause the displacement of the plunger 19 separating it from the piston 15 and, therefore, separation of the piston 15 from the plunger. This displacement carries the sealing ring 38 past the rim of the skirt 15a allowing communication between the annular chamber 39 and the annular duct 40. The compressed air which is thus introduced into the chamber 41 balances the forces exerted on the two opposed faces of the piston 15 so that this remains in the position illustrated in FIG. 2, that is to say, in contact with the projections 20 of the transverse wall 14c. The valve plate 27 is thus held away from the rim 29 of the central opening 25 in the piston so that the compressed air can pass from the first chamber 17 to the second chamber 18, through the annular passageway defined by the opening 25, without any substantial reduction in pressure. Thus when the force Q is absent this embodiment always operates with the output pressure Pu substantially equal to the input pressure Pe. The valve element 44 which covers the hole 46 is held shut by the spring 45 and by the pressure difference across the valve element 44 itself (the pressure in the pipe 13 from the junction 13a with the front brake control circuit would usually be higher than the pressure in the chamber 17). However, if, for any reason, such as a failure in the front brake circuit the pressure normally present in the control circuit 8 is reduced or absent altogether, the valve element 44 is displaced by the air pressure in the first chamber 17 overcoming the force of the spring 45 to permit communication, through the passages 46 and 47, between the first chamber 17 and the annular chamber 41. Thus, even though there may be a force Q exerted on the plunger 19 the piston 15 is held, for all brake pedal pressures, against the stops 20 so that the braking pressure at the outlet 30 is always substantially the same as the pressure at the inlet 21. Clearly, if for any reason the braking of the front brakes is reduced the rear brakes must be operated at full pressure, without any reduction, in order to compensate for the loss of braking effect on the front wheels.

We claim:

1. A control device for a pneumatic braking system of a motor vehicle, comprising:
   a generally cylindrical housing,
   respective transverse end walls closing each end of said generally cylindrical housing,
   a cylindrical bore in said housing,
   a piston slidable along said cylindrical bore in said housing, said bore having first and second parts of relatively small and large diameters respectively, said piston having a first part with a smaller diameter located within said first part of said cylindrical bore, and a second part with a larger diameter located slidably within said second part of said cylindrical bore, said piston separating said bore in said housing into first and second chambers on either side of said piston, an inlet port adapted to be connected in a first braking circuit and located in said housing for leading fluid pressure into said first chamber, an outlet port adapted to be connected in said first braking circuit and located in said housing for leading fluid pressure from said second chamber, the area of the operative face of said piston exposed in said first chamber being less than the area of the operative face of said piston exposed in said second chamber so that said piston experiences a resultant force towards said first chamber when the fluid pressure in both chambers is the same, means defining a fluid transfer passageway between said first and second chambers, said means including said piston and incorporating a variable restrictor passage controlled in dependence on the position of said piston such that the size of said restrictor passage is reduced upon movement of said piston towards said first chamber whereby to reduce the fluid pressure in said second chamber with respect to that in said frst chamber, means for applying to said first part of said piston a fluid pressure force in a sense such as to resist said resultant force tending to move said piston towards said first chamber due to the difference in area between the faces of said piston exposed in said first and second chambers respectively, whereby, when said resultant force acting on said piston due to said difference in areas of said piston faces in said first and second chambers exceeds said fluid pressure force applied to said first part of said piston, said piston is displaced towards said first chamber thereby reducing the size of said restrictor passage and thus the fluid pressure in said second chamber until the forces on said piston are balanced, thereby attenuating the fluid pressure at said outlet port with respect to that at said inlet port, a plunger, which is slidable within that part of the bore defining said first chamber and mechanically linked to said piston so that a load responsive force applied to said plunger to depress it towards said piston is transferred to said piston, there being an opening in one end wall of the housing through which projects one end of said plunger on which end can be applied said load responsive force whereby to resist said resultant force tending to move said piston towards said first chamber within said housing in use of said device, means defining an annular chamber facing said second part of said piston opposite said second chamber, means defining an internal passageway communicating at one end with said annular chamber and at the other end with said first chamber, means defining an auxiliary port adapted to be connected to a second braking circuit and located in said housing adjacent said internal passageway, a valve shutter in said auxiliary port movable between a first position blocking fluid communication between said first and annular chambers when fluid pressure from said second brake circuit is applied at said auxiliary port equal to or greater than the fluid pressure at said inlet port and a second position allowing fluid communication between said first and annular chambers through said internal passageway, said plunger having a recess in the other end thereof defining an intermediate chamber, axial and radial passageways in said plunger providing fluid communication between said intermediate chamber and said first chamber, said transfer passageway providing fluid communication between said intermediate chamber and said second chamber, the dimensions of said intermediate chamber being such that the fluid pressure entering said intermediate chamber causes an upward thrust on said plunger greater than a downward thrust exerted on said plunger by the fluid pressure contained in said first chamber so that in the absence of any said load responsive force acting on said plunger and said valve shutter being in said second position the plunger is displaced by said upward thrust away from said piston, and means defining an annular passageway between said piston and said bore communicating with said annular chamber so that upon displacement of said plunger out of engagement with said piston fluid communication will be established between said intermediate chamber and said annular chamber through said annular passageway thereby the fluid pressure at said outlet port being equal to that at said inlet port.

* * * * *